E. B. MITCHESON.
Mustache-Spoons.
No. 135,141.          Patented Jan. 21, 1873.
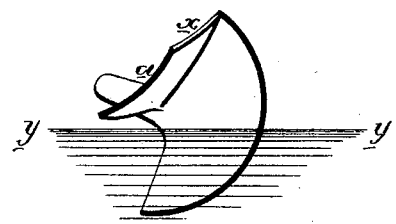
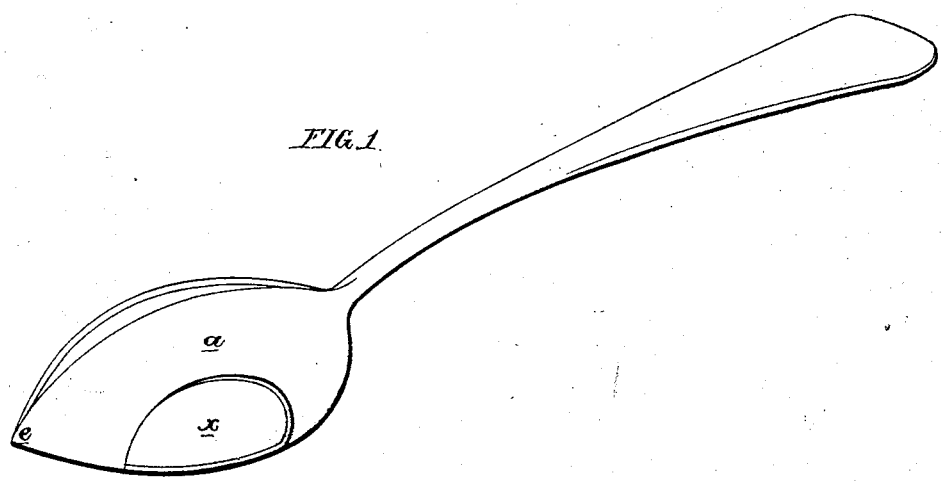

UNITED STATES PATENT OFFICE.

ELLEN B. A. MITCHESON, OF PHILADELPHIA, PENNSYLVANIA.

IMPROVEMENT IN MUSTACHE-SPOONS.

Specification forming part of Letters Patent No. 135,141, dated January 21, 1873.

*To all whom it may concern:*

Be it known that I, ELLEN B. A. MITCHESON, of the city and county of Philadelphia, State of Pennsylvania, have invented a Mustache-Spoon, of which the following is a specification:

The object of my invention is to enable the wearer of a mustache to convey soup and other liquids to his mouth by means of a spoon without danger of soiling or disfiguring his mustache; and this object I attain by combining with the bowl of a spoon a shield, $a$, in the manner shown in the perspective view, Figure 1, the shield being such that, while it permits the user of the spoon to receive into the bowl by the usual dipping process a proper quantity of soup, the latter can be conveyed to the mouth without any portion of the liquid being brought into contact with the mustache.

The shield $a$ extends longitudinally from the tip $e$ of the bowl to the point where the latter is united to the handle, so as to leave about one-half of the bowl exposed. The shield, however, is so cut away as to leave an opening, $x$, of such dimensions that it can be easily overlapped and underlapped by the lips, and yet permit the contents of the bowl, when the latter is tilted, to flow freely into the mouth.

An important feature of my invention is the turning up of the outer edge of the shield, so as to prevent any of the liquid from gaining access to the upper surface of the shield on dipping the bowl into the liquid.

The advantage of thus shaping the shield will be rendered obvious by referring to the transverse section, Fig. 2, which illustrates the position of the bowl as it is being dipped into the liquid, the surface of the latter being represented by the line $y$.

I claim as my invention—

The combination, substantially as described, of the shield $a$ with the bowl of a spoon, for the purpose specified.

In testimony whereof I have signed my name to this specification in the presence of two subscribing witnesses.

ELLEN B. A. MITCHESON.

Witnesses:
ELIZABETH THOMPSON,
E. CARE.